United States Patent
Dudar

(10) Patent No.: US 9,611,814 B2
(45) Date of Patent: Apr. 4, 2017

(54) SYSTEMS AND METHODS FOR REDUCING AIRFLOW RESTRICTION THROUGH EMISSIONS CONTROL SYSTEMS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/607,962

(22) Filed: Jan. 28, 2015

(65) Prior Publication Data
US 2016/0215734 A1   Jul. 28, 2016

(51) Int. Cl.
*F02M 25/08* (2006.01)
*G05D 7/06* (2006.01)
*F02M 25/00* (2006.01)

(52) U.S. Cl.
CPC ...... *F02M 25/0836* (2013.01); *F02M 25/089* (2013.01); *G05D 7/0635* (2013.01)

(58) Field of Classification Search
CPC ............ F02M 25/0836; F02M 25/089; B60K 15/03504
USPC ................... 123/519, 520, 518, 516
See application file for complete search history.

(56) References Cited

U.S. PATENT DOCUMENTS

| | | | | |
|---|---|---|---|---|
| 4,815,436 A * | 3/1989 | Sasaki | ............. | B60K 15/03504 123/520 |
| 4,872,439 A * | 10/1989 | Sonoda | ............ | B60K 15/03504 123/516 |
| 5,056,494 A * | 10/1991 | Kayanuma | ......... | F02M 25/0872 123/516 |
| 5,111,795 A * | 5/1992 | Thompson | ......... | F02M 25/0872 123/519 |
| 5,143,041 A * | 9/1992 | Franzke | ............. | F02M 25/0854 123/516 |
| 5,165,379 A * | 11/1992 | Thompson | ....... | B60K 15/03504 123/516 |
| 5,398,660 A * | 3/1995 | Koyama | ............ | F02M 25/0854 123/519 |
| 5,477,836 A * | 12/1995 | Hyodo | ............... | F02M 25/0854 123/519 |

(Continued)

FOREIGN PATENT DOCUMENTS

JP   2006046144 A  *  2/2006

OTHER PUBLICATIONS

Dudar, Aed M., "System and Methods for Managing Refueling Vapors," U.S. Appl. No. 14/313,629, filed Jun. 24, 2014, 35 pages.

(Continued)

*Primary Examiner* — Mahmoud Gimie
(74) *Attorney, Agent, or Firm* — James Dottavio McCoy Russell LLP

(57) ABSTRACT

A method for a fuel system is presented, comprising directing purge air through a first fuel vapor canister but not a second fuel vapor canister based on a load of the first fuel vapor canister being greater than a threshold. In this way, purging of the first canister may be prioritized and completed without passing desorbed fuel vapors through the second canister, thereby reducing the amount of time needed to purge the first canister, and reducing overall emissions.

18 Claims, 7 Drawing Sheets

(56) References Cited

U.S. PATENT DOCUMENTS

| | | | | |
|---|---|---|---|---|
| 5,564,398 A | * | 10/1996 | Maeda | F02M 25/0854 |
| | | | | 123/519 |
| 5,806,500 A | * | 9/1998 | Fargo | F02M 25/089 |
| | | | | 123/198 D |
| 6,463,889 B2 | * | 10/2002 | Reddy | F02M 33/02 |
| | | | | 123/3 |
| 6,817,346 B2 | * | 11/2004 | Konishi | F02M 25/089 |
| | | | | 123/519 |
| 7,614,387 B2 | | 11/2009 | Wang et al. | |
| 7,762,241 B2 | | 7/2010 | Childress et al. | |
| 8,919,327 B2 | * | 12/2014 | Pearce | F02M 25/0836 |
| | | | | 123/519 |
| 2012/0204720 A1 | | 8/2012 | Tschantz et al. | |
| 2013/0298879 A1 | * | 11/2013 | Pearce | F02M 25/0836 |
| | | | | 123/520 |

OTHER PUBLICATIONS

Dudar, Aed M., "System and Methods for Purging a Fuel Vapor Canister Buffer," U.S. Appl. No. 14/284,238, filed May 21, 2014, 41 pages.

* cited by examiner

SYSTEMS AND METHODS FOR REDUCING AIRFLOW RESTRICTION THROUGH EMISSIONS CONTROL SYSTEMS

BACKGROUND AND SUMMARY

Emissions control systems for vehicles include a fuel vapor canister configured to adsorb refueling, diurnal, and running loss vapors. Vehicles classified as practically zero emissions vehicles (PZEVs) in North America are required to include a bleed canister in addition to the main fuel vapor canister. Over the course of one or more diurnal cycles, fuel vapor may become desorbed from the main fuel vapor canister. The bleed canister may be located between the main fuel vapor canister and atmosphere and configured to bind the desorbed vapors.

In order to prevent bleed emissions, the bleed canister may include honeycomb shaped folds of adsorbent or other such structures to provide a large surface area for binding low weight hydrocarbons. However, this may cause airflow through the canister to be highly restrictive. For systems where the bleed canister is in series with the main fuel vapor canister, the bleed canister may effectively act as an airflow resistor that reduces flow through the main canister. Similarly, the main canister may act as a resistor that reduces flow through the bleed canister.

During a purge event, this may increase the time needed to purge the canisters. For hybrid vehicles, and other vehicles with limited engine run time and/or limited engine intake vacuum, the opportunities to purge the canisters may already be limited. Failure to purge the canisters may lead to bleed emissions or failed evaporative emissions tests. If the bleed canister is empty, there is no practical reason to direct purge air there through. If the bleed canister is loaded, passing purged vapors into the main canister before directing them to intake may reduce the purge efficiency. Further, during refueling events, refueling vapors may be generated at a higher rate than air stripped of the vapors exits to atmosphere if it must pass through the restrictive bleed canister. This may lead to pre-mature shutoffs of the refueling dispenser.

The inventors herein have recognized the above issues, and have developed systems and methods to at least partially address them. In one example, a method for a fuel system is presented, comprising directing purge air through a first fuel vapor canister but not a second fuel vapor canister based on a load of the first fuel vapor canister being greater than a threshold. In this way, purging of the first canister may be prioritized and completed without passing desorbed fuel vapors through the second canister, thereby reducing the amount of time needed to purge the first canister, and reducing overall emissions.

In another example, a method for a fuel system is presented, comprising: directing fuel vapor from a fuel tank into a first fuel vapor canister but not a second fuel vapor canister based on a fuel tank pressure. In this way, fuel tank depressurization may proceed more rapidly than it would if the fuel vapor were directed through a more restrictive pathway. Further, fuel tank pressure during refueling may be moderated, thus preventing automatic shutoffs of the refueling pump.

In yet another example, an emissions control system for a vehicle is presented, comprising: a fuel tank coupled to a main fuel vapor canister via a fuel tank isolation valve, a canister purge valve coupled between the main fuel vapor canister and an engine intake, a bleed fuel vapor canister coupled between the main fuel vapor canister and atmosphere, a bleed canister bypass valve coupled within a bleed canister bypass conduit, and a controller configured with instructions stored in non-transitory memory, that when executed, cause the controller to: open the canister purge valve; and open the bleed canister bypass valve responsive to a load of the bleed fuel vapor canister being less than a threshold. In this way, if the bleed canister is not loaded with hydrocarbons, it may be bypassed, thus increasing the purge flow through the main fuel vapor canister.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows a fuel system and emissions system for a vehicle engine.

FIG. 3A schematically shows an emissions system in a conformation to purge a bleed canister while bypassing a main canister.

FIG. 3B schematically shows an emissions system in a conformation to purge a main canister while bypassing a bleed canister.

FIG. 3C schematically shows an emissions system in a conformation to store fuel vapor in a main canister while bypassing a bleed canister.

DETAILED DESCRIPTION

Figure 2:
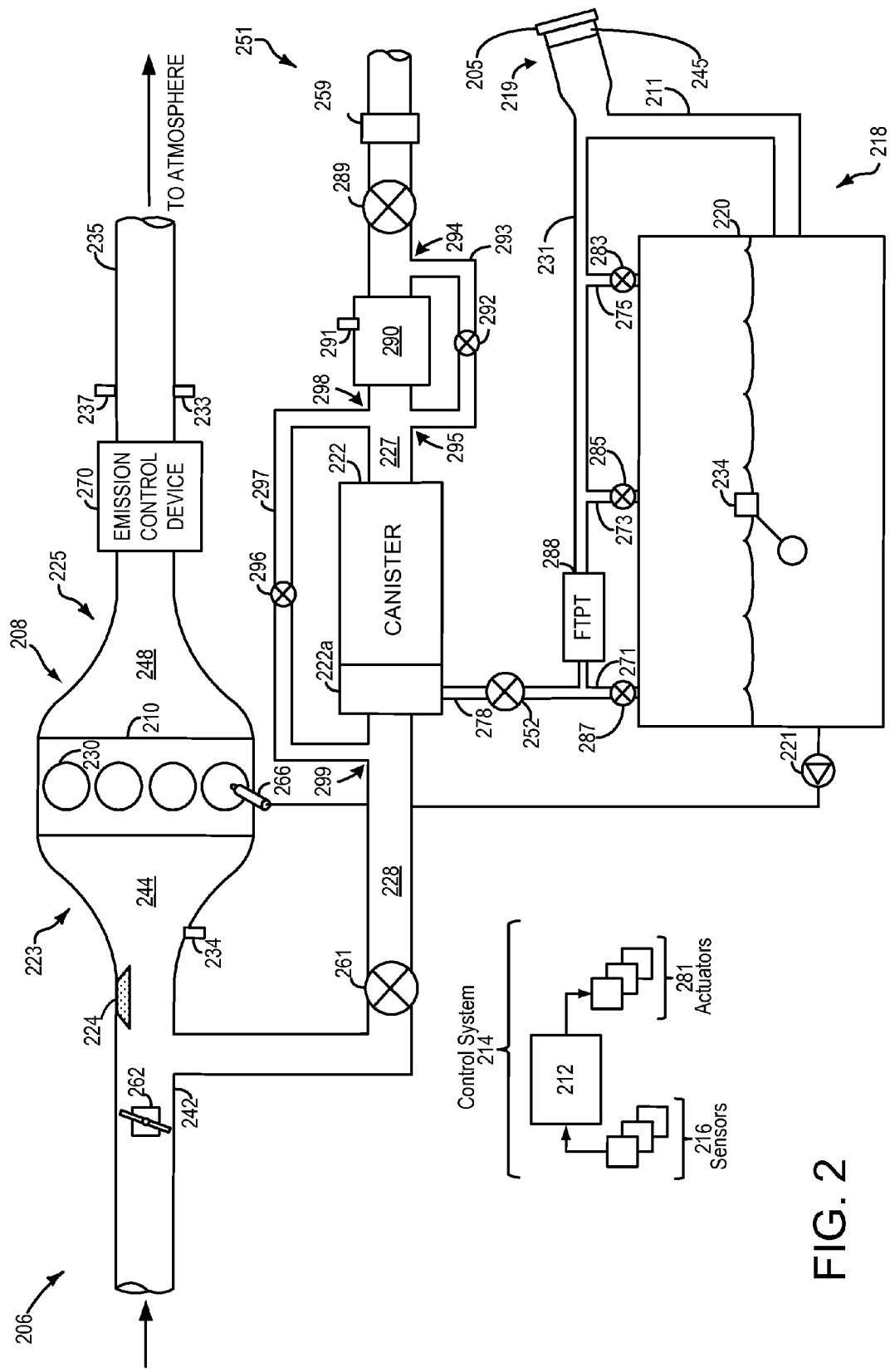
Figure 3A:
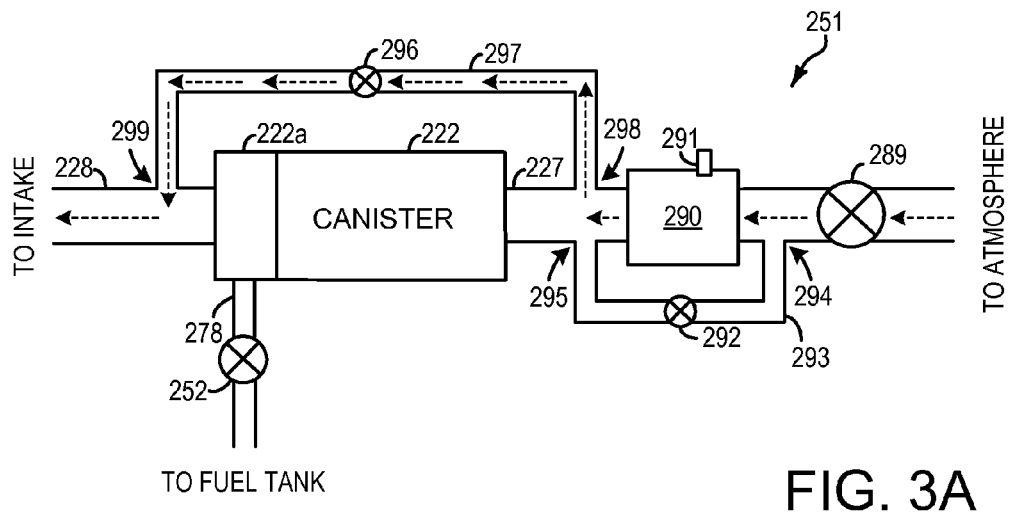
Figure 3B:
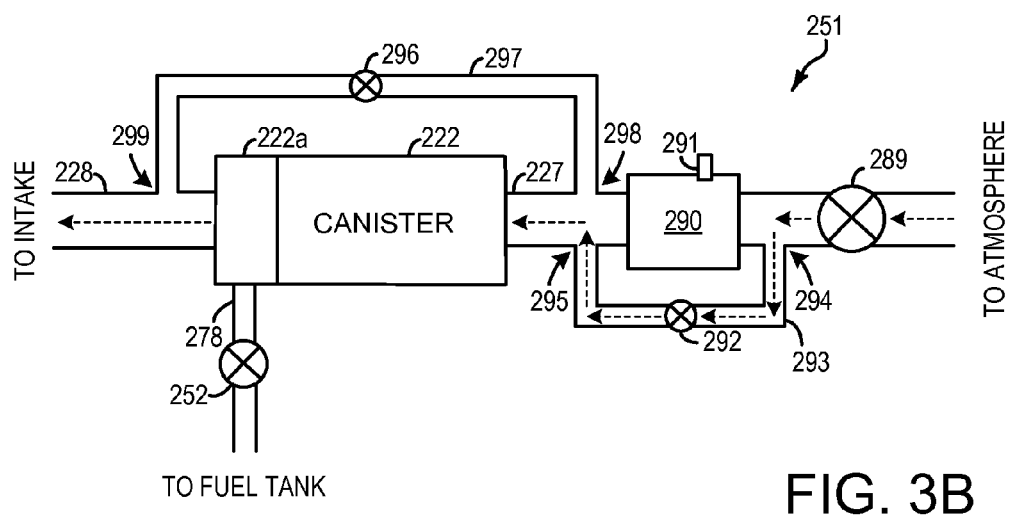
Figure 3C:
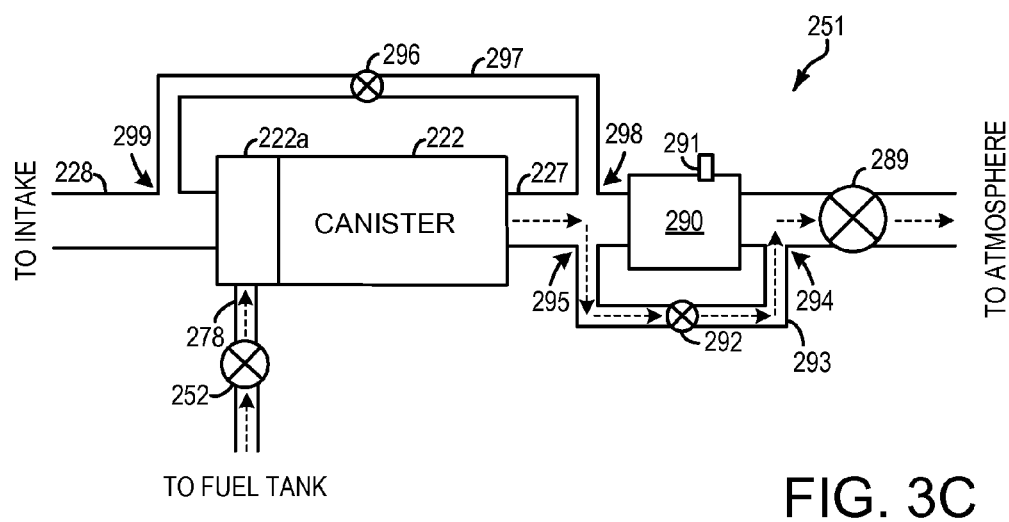
Figure 4:
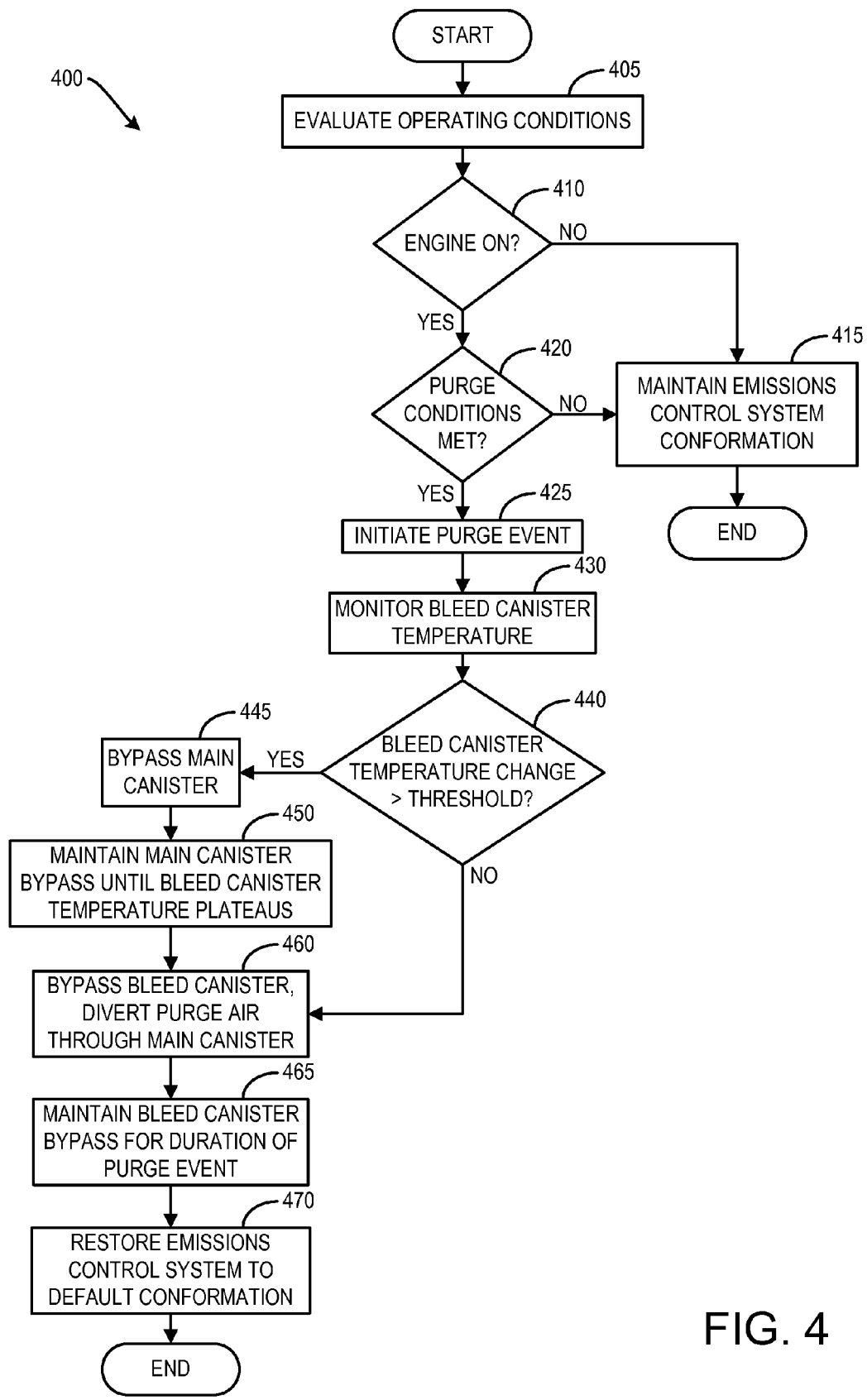
FIG. 4 shows a flow chart for an example high-level method for a canister purge operation.
Figure 5:
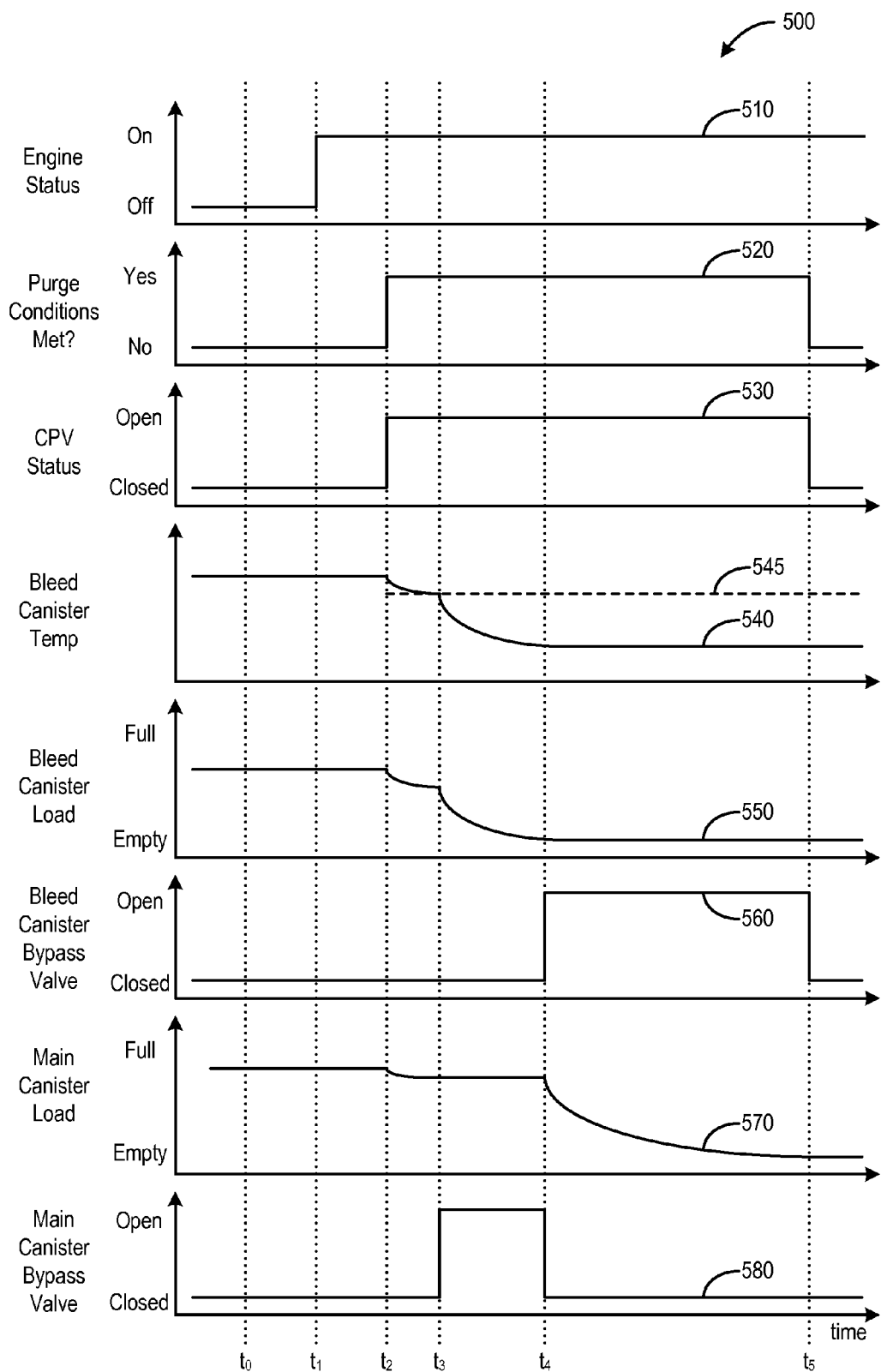
FIG. 5 shows an example timeline for a canister purge operation using the method depicted in FIG. 4.
Figure 6:
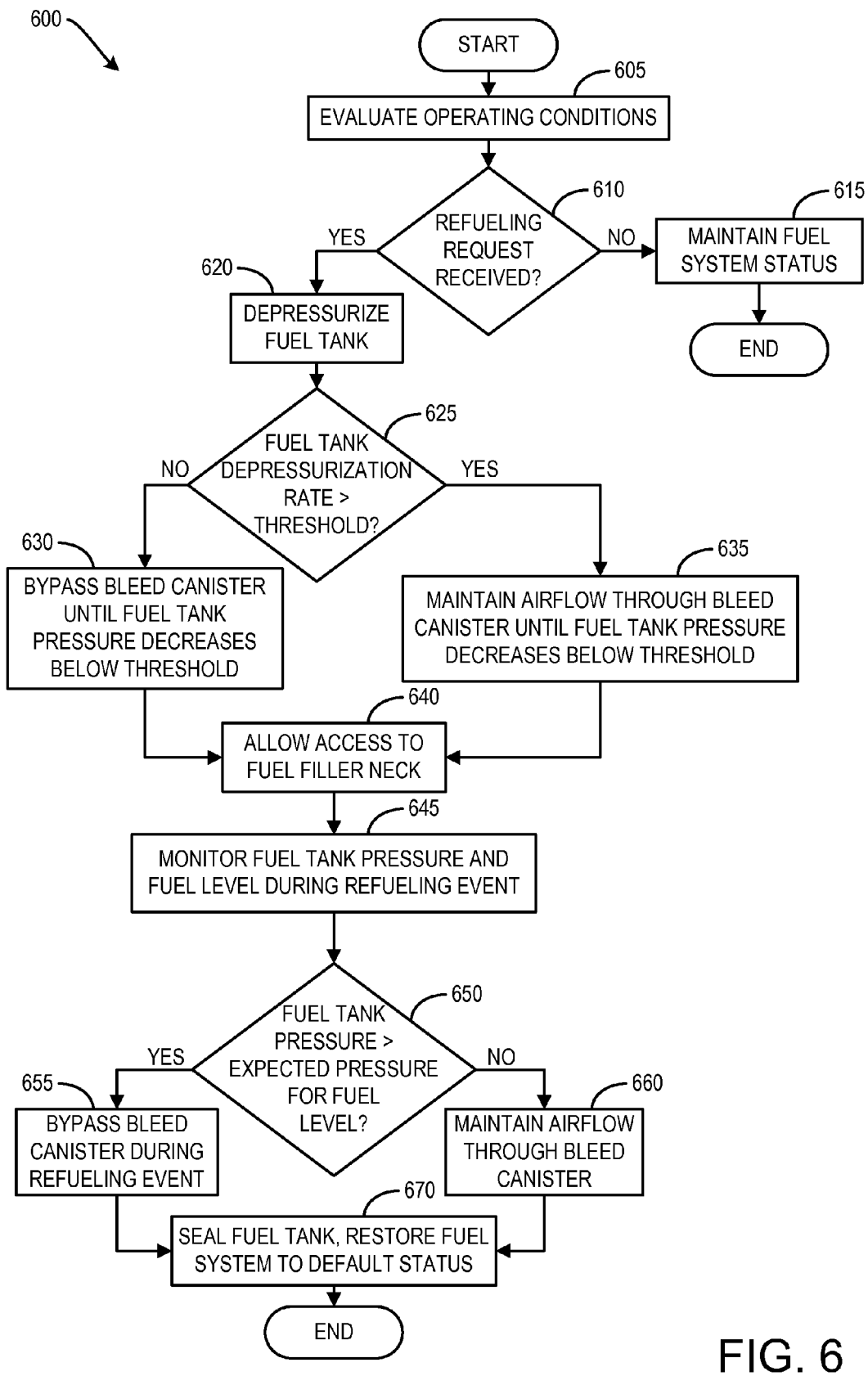
FIG. 6 shows a flow chart for an example high-level method for a refueling event.
Figure 7:
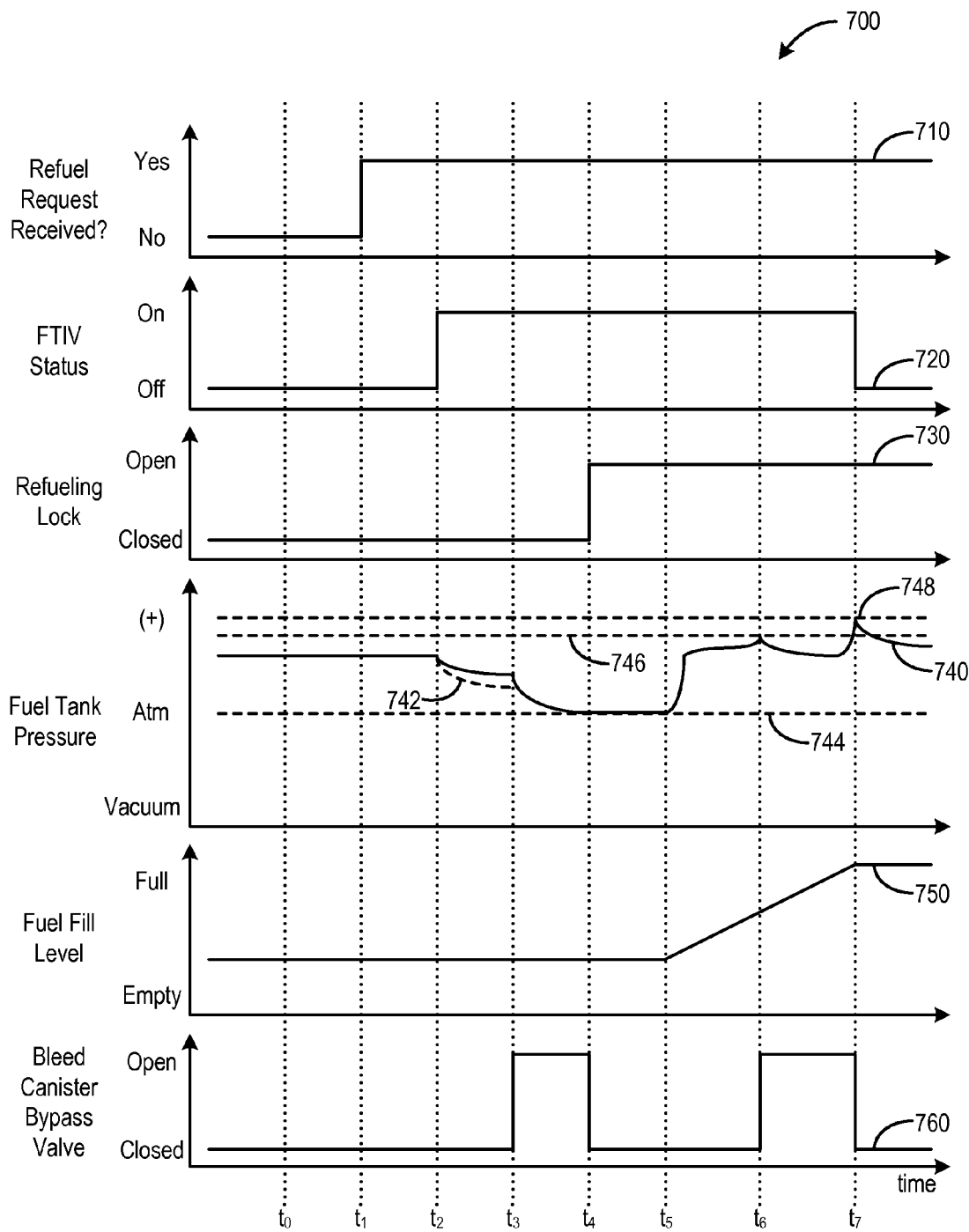
FIG. 7 shows an example timeline for a refueling event using the method depicted in FIG. 6.

This detailed description relates to systems and methods for an emissions control system in a vehicle. More specifically, the description relates to systems and methods for selectively bypassing a primary fuel vapor canister and/or a secondary bleed emissions canister during a purge operation, and for selectively bypassing the secondary bleed emissions canister during a refueling event. The emissions control system may be coupled within a hybrid electric vehicle, such as the plug-in hybrid electric vehicle depicted in FIG. 1. The emissions control system may be coupled to a fuel system and an engine system, as depicted in FIG. 2. The emissions control system may include bypass conduits and valves for selectively bypassing the main fuel vapor canister and/or the bleed canister, which may be engaged to direct the flow of refueling vapors and/or purge gasses as shown in FIGS. 3A-3C. During a purge event, the bleed canister may be bypassed to increase airflow through the main canister, or the main canister may be bypassed if purging the bleed canister is prioritized. A method for a purge event using this system is depicted in FIG. 4. A timeline for an example purge event using the method of FIG. 4 is shown in FIG. 5. During a refueling event the bleed canister may be bypassed to allow fuel vapor pressure within the fuel tank to decrease. A method for a refueling event using this system is depicted in FIG. 6. A timeline for an example refueling event using the method of FIG. 6 is shown in FIG. 7.

Figure 1:
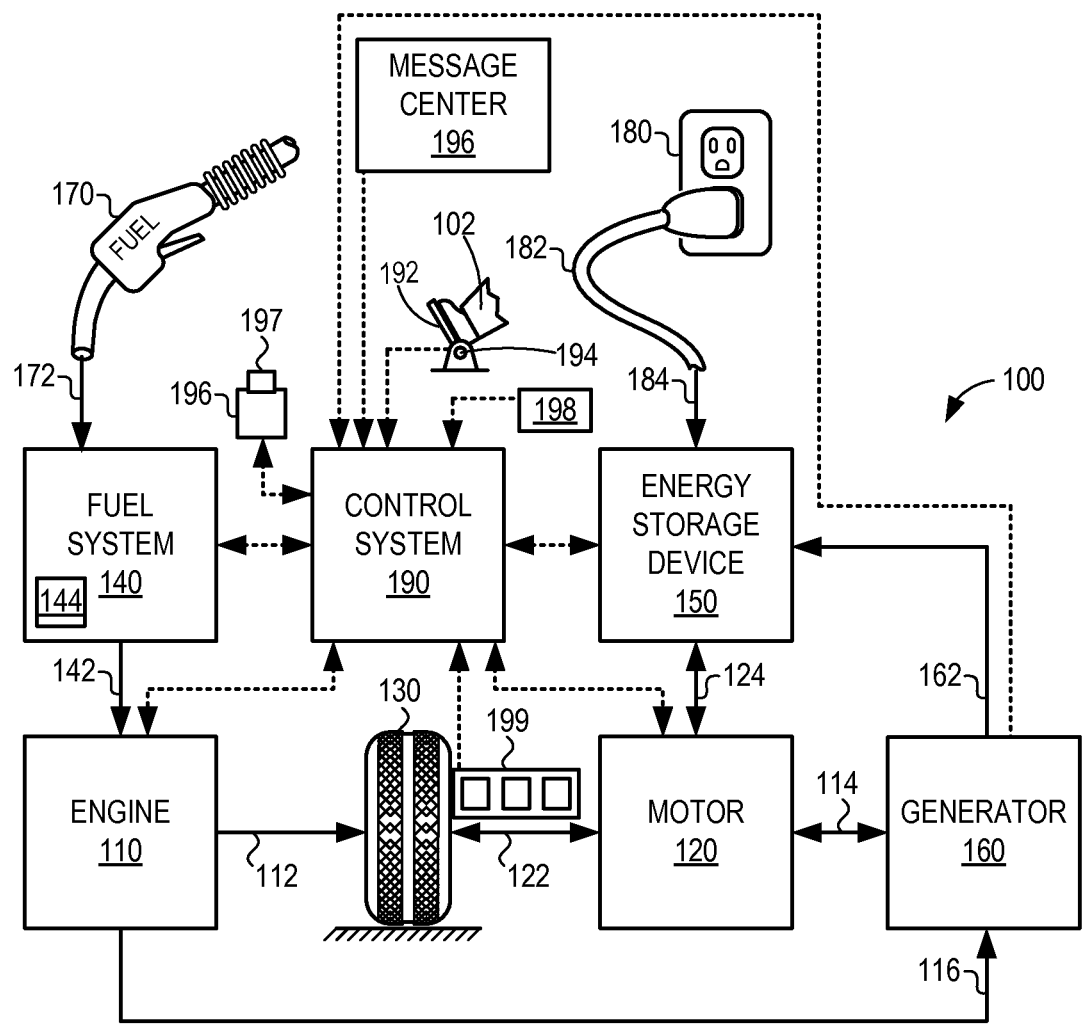

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

Engine 110 may be started with an engine starting system that includes motor 120 driven by energy from energy storage device 150. In another example, the starter may be a powertrain drive motor, such as a hybrid powerplant connected to the engine by way of a coupling device. The coupling device may include a transmission, one or more gears, and/or any other suitable coupling device. The starter may be configured to support engine restart at or below a predetermined near zero threshold speed (e.g., below 50 or 100 rpm). In other words, by operating motor 120, engine 110 may be spun. During some conditions, such as during a key-on condition when engine operation is desired for vehicle motion, the engine may be started (e.g., using motor assistance) and spun fueled (that is, with fuel and air being injected into engine cylinders) to enable cylinder combustion. During other conditions, as elaborated in FIGS. 3-5, such as during selected key-on or key-off conditions, the engine may be started with motor assistance and spun unfueled (that is, with no air or fuel injected into the engine cylinders) to generate intake vacuum. The engine may be spun until a threshold vacuum is generated after which the spinning may be stopped. The generated vacuum may be subsequently applied to fuel system 140 for leak detection diagnostics.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 3, 4, and 5, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system, and may include components as described for vehicle propulsion system 100.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include universal exhaust gas oxygen (UEGO) sensor 237 located upstream of the emission control device, temperature sensor 233, pressure sensor 288, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 253, and refueling lock 245. The control system 214 may include a controller 212. The controller may be shifted between sleep and wake-up modes for additional energy efficiency. During a sleep mode the controller may save energy by shutting down on-board sensors, actuators, auxiliary components, diagnostics, etc. Essential functions, such as clocks and controller and battery maintenance operations may be maintained on during the sleep mode, but may be operated in a reduced power mode. During the sleep mode, the controller will expend less current/voltage/power than during a wake-up mode. During the wake-up mode, the controller may be operated at full power, and components operated by the controller may be operated as dictated by operating conditions. The controller may receive input data from the various sensors, process the input data, and trigger the actuators in response to the processed input data based on instruction or code programmed therein corresponding to one or more routines. Example control routines are described herein with regard to FIGS. 3-5.

In some configurations, a canister vent valve (CVV) 289 may be coupled within vent line 227. CVV 289 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 289 may be a solenoid valve wherein opening or closing of the valve is performed via actuation of a canister vent solenoid. In particular, the canister vent valve may be an open that is closed upon actuation of the canister vent solenoid. In some examples, CVV 289 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Emissions control system 251 may further include a bleed canister 290. Hydrocarbons that desorb from canister 222 (hereinafter also referred to as the "main canister") over the course of one or more diurnal cycles may be adsorbed within the bleed canister. Vehicles classified as practically zero emissions vehicles (PZEVs) in North America are required to include a bleed canister. Bleed canister 290 may include an adsorbent material that is different than the adsorbent material included in main canister 222. As lighter hydrocarbons such as butanes and pentanes are more likely to desorb due to temperature increases, the bleed canister may be configured to preferentially adsorb these hydrocarbons at relatively low concentrations. Accordingly, the adsorbent within bleed canister 290 may be comprised of an activated carbon or other suitable scrubber element with a relatively high percentage of micropores compared to the adsorbent within main canister 222, such as activated carbon derived from coconut shells. The adsorbent may be molded into a honey-comb shape or other suitable flow path to increase the surface area available for adsorbance. A temperature sensor 291 may be coupled to bleed canister 290 in order to gauge the adsorbance and desorbance of hydrocarbons, as they are exothermic and endothermic reactions, respectively.

However, the nature of the bleed canister means that airflow through the bleed canister is restricted as compared to airflow through the main canister. In effect, the bleed canister acts as an airflow resistor in series with the main canister. This may limit purge air flow through the main canister during purge events, as air drawn through the vent line must pass through the bleed canister before proceeding to the main canister. Similarly, in purging the bleed canister, the main canister may act as an airflow resistor, which may limit purge air flow through the bleed canister. Additionally, refueling events may be impeded by having the bleed canister in series with the main canister. Both during fuel tank depressurization and during the refueling event, air stripped of refueling vapors by the main canister must traverse the bleed canister before exiting to atmosphere. This may extend the time needed to depressurize the fuel tank. Further, this may lead to pre-mature refueling shutoff, as the fuel tank pressure may increase above a threshold if the refueling vapors are restricted from passing through the canisters. As the canisters age, the airflow there through will become even more restricted, exacerbating the problems.

To counter airflow restrictions through the emissions control system, the system may include one or more means of bypassing the bleed canister and/or the main canister. As shown in FIG. 2, emissions control system 251 includes a bleed canister bypass valve 292 coupled within a bleed canister bypass conduit 293. Bleed canister bypass valve 292 may be a solenoid valve, and may be a default-closed valve. In some examples, bleed canister bypass valve 292 may be a latchable solenoid valve. Additionally or alternatively, a check valve may be coupled within bleed canister bypass conduit 293, the check valve configured to open to allow airflow through bleed canister bypass conduit 293 towards atmosphere responsive to a fuel tank-side pressure greater than a threshold. This configuration will be described further with regard to FIG. 3C. Bypass conduit 293 may intersect vent line 227 on the atmospheric side of bleed canister 290 at first bypass junction 294 and at the fuel tank side of bleed canister 290 at second bypass junction 295. First bypass junction 294 may be coupled between bleed canister 290 and canister vent valve 289, while second bypass junction 295 may be coupled between bleed canister 290 and main canister 222. One or more pressure sensors may be coupled to bypass conduit 293.

Emissions control system 251 may also include a main canister bypass valve 296 coupled within a main canister bypass conduit 297. Main canister bypass valve 296 may be a solenoid valve, and may be a default-closed valve. In some examples, main canister bypass valve 296 may be a latchable solenoid valve. Bypass conduit 293 may intersect vent line 227 on the atmospheric side of main canister 222 at third bypass junction 298 and at the engine intake side of main canister 222 at fourth bypass junction 299. Third bypass junction 298 may be coupled between main canister 222 and bleed canister 290, while fourth bypass junction 299 may be coupled main canister 222 and canister purge valve 261. One or more pressure sensors may be coupled to bypass conduit 297.

FIGS. 3A-3C schematically show purge air and fuel vapor flow through emissions control system 251 in various conformations. FIG. 3A shows emissions control system 251 in a conformation to purge bleed canister 290 while bypassing main canister 222. In this conformation, vent valve 289 is open, bleed canister bypass valve 292 is closed, main canister bypass valve 296 is open, FTIV 252 is closed, and CPV 261 is open (not shown). In this conformation, engine intake vacuum draws purge air from atmosphere into vent line 227. The purge air traverses CVV 289, and then enters the atmospheric side of bleed canister 290. Hydrocarbons are desorbed from bleed canister 290 and exit the intake side of the bleed canister into vent line 227. The purge air and desorbed hydrocarbons then enter main canister bypass conduit 297 before entering purge line 228, where they are then drawn into engine intake. Some purge air and desorbed hydrocarbons may traverse main canister 222, though the majority of gas flow will be through the unrestricted main canister bypass conduit 297.

FIG. 3B shows emissions control system 251 in a conformation to purge main canister 222 while bypassing bleed canister 290. In this conformation, vent valve 289 is open, bleed canister bypass valve 292 is open, main canister bypass valve 296 is closed, FTIV 252 is closed, and CPV 261 is open (not shown). In this conformation, engine intake vacuum draws purge air from atmosphere into vent line 227. The purge air traverses CVV 289, and then enters bleed canister bypass conduit 293. The purge air then enters the atmospheric side of main canister 222. Hydrocarbons are desorbed from main canister 222 and exit the intake side of the main canister into purge line 228. The purge air and desorbed hydrocarbons are then drawn into engine intake. Some purge air and desorbed hydrocarbons may traverse bleed canister 290, though the majority of gas flow will be through the unrestricted bleed canister bypass conduit 293.

FIG. 3C shows emissions control system 251 in a conformation to adsorb refueling/diurnal vapors in main canister 222, while bypassing bleed canister 290. In this conformation, CPV 261 is closed (not shown), FTIV 252 is open, main canister bypass valve is closed, bleed canister bypass valve is open, and CVV 289 is open. In this conformation, fuel vapor exits fuel tank 220 (not shown), traversing FTIV 252, and entering canister buffer 222a via conduit 278. Air stripped of fuel vapor exits the atmospheric side of main canister 222 into vent line 227. Air stripped of fuel vapor then enters bleed canister bypass conduit 293, and then traverses CVV 289 before exiting vent line 227 to atmosphere. Some air stripped of fuel vapor may traverse bleed canister 290, though the majority of gas flow will be through the unrestricted bleed canister bypass conduit 293.

FIG. 4 shows a flow chart for an example high-level method 400 for a purge event. More specifically, method 400 describes a method for performing a purge event where one or more of the main canister and the bleed canister may be bypassed. Method 400 will be described in reference to the systems described in FIGS. 1, 2, and 3A-3B, though it should be understood that method 400 may be applied to other systems without departing from the scope of this disclosure. Method 400 may be carried out by a controller, such as controller 212, and may be stored as executable instructions in non-transitory memory.

Method 400 may begin at 405. At 405, method 400 may include evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc., and various ambient conditions, such as temperature, barometric pressure, humidity, etc.

Continuing at 410, method 400 may include determining whether the engine is on. For hybrid vehicles, and other vehicles configured to run in an engine-off mode, the method may include determining whether the engine is currently operating in a combustion mode or other such mode where purge gasses would be combusted upon entering the engine intake. In some examples, the vehicle may be configured to run with one or more cylinders de-activated. Depending on the vehicle and engine configuration, operating with one or more cylinders de-activated may be categorized as either engine-on or engine-off, depending on whether purge gasses would be combusted upon entering the engine intake. If the engine is not on, method 400 may proceed to 415. At 415, method 400 may include maintaining the current status and conformation of the emissions control system and fuel system. For example, valves such as the CPV, CVV, FTIV, Main canister bypass valve, and bleed canister bypass valve may be maintained in their current position. Method 400 may then end. If the engine is on, method 400 may proceed to 420. At 420, method 400 may include determining whether purge conditions are met. Determining whether purge conditions are met may include determining canister load, engine operating status, engine intake vacuum level, and commanded A/F ratio. If purge conditions are not met, method 400 may proceed to 415. At 415, method 400 may include maintaining the current status of the emissions control system and the fuel system. Method 400 may then end. Although purge conditions may be met at the beginning of method 400, if operating conditions change during the execution of method 400, the purge operation may be aborted, and the emissions control system and fuel system restored to a default conformation. A flag may be set at controller 212 to follow up when purge conditions are again met. Method 400 may then end.

If purge conditions are met, method 400 may proceed to 425. At 425, method 400 may include initiating a purge event. Initiating a purge event may include closing or maintaining the FTIV closed, and may further include opening the CPV and opening or maintaining the CVV open so as to apply engine vacuum in order to draw atmospheric air into the vent line. Referring to FIG. 2, initiating a purge event may include closing and/or maintaining closed bleed canister bypass valve 292 and main canister bypass valve 296. However, if the bleed canister load is known to be greater than a threshold, the main canister bypass valve may be opened at purge initiation while the bleed canister bypass valve is maintained closed. Similarly, if the bleed canister load is known to be less than a threshold, the bleed canister bypass valve may be opened at purge initiation while the main canister bypass valve is maintained closed.

Continuing at 430, once the purge event has been initiated, method 400 may include monitoring the temperature within the bleed canister. For example, controller 212 may record signals output by bleed canister temperature sensor 291. Continuing at 440, method 400 may include determining whether an initial bleed canister temperature change is greater than a threshold. The endothermic nature of the desorption reaction may lead to a decrease in bleed canister temperature if hydrocarbons are adsorbed therewithin. The bleed canister temperature may be monitored for a predetermined duration, a duration based on the current operating conditions, and/or until consecutive temperature readings differ by a threshold. In some examples, the threshold may reflect a rate of change of bleed temperature. If the initial bleed canister temperature change is greater than the threshold, method 400 may proceed to 445. At 445, method 400 may include bypassing the main canister while maintaining purge air flow through the bleed canister. This may include opening the main canister bypass valve while maintaining the bleed canister bypass valve closed. This example configuration is shown in FIG. 3A. In this way, the contents of the bleed canister may be purged without passing the purge air through the restrictive main canister. The purging of the bleed canister is thus effectively prioritized over the purging of the main canister, as hydrocarbons adsorbed within the bleed canister are more likely to result in bleed emissions if the vehicle is parked over one or more diurnal cycles.

Continuing at 450, method 400 may include maintaining main canister bypass until the bleed canister temperature plateaus, or is otherwise determined to have a hydrocarbon load below a threshold. When it is determined that the rate of hydrocarbon desorption from the bleed canister is less than a threshold and/or bleed canister temperature change is less than a threshold, method 400 may proceed to 460. At 460, method 400 may include bypassing the bleed canister while diverting purge air through the main canister. For example, this may include opening the bleed canister bypass valve while closing the main canister bypass valve. This example configuration is shown in FIG. 3B. In this way, the contents of the main canister may be purged without passing the purge air through the restrictive bleed canister. Continuing at 465, method 400 may include maintaining the bleed canister bypass for the duration of the purge event. The duration of the purge event may be predetermined, based on current operating conditions, based on the load of the main canister, and/or based on hydrocarbon desorption from the main canister, based on readings from a main canister temperature sensor, a hydrocarbon sensor, an intake oxygen sensor, an exhaust oxygen sensor, or other suitable method for determining the contents of purge gasses.

When the purge event is finished, method 400 may proceed to 470. At 470, method 400 may include restoring the emissions control system and fuel system to a default conformation. For example, the CPV may be closed, and the main canister bypass and bleed canister bypass valves closed. Controller 212 may record the purge event, and update purge schedules and other emissions control system operations accordingly. Method 400 may then end.

FIG. 5 shows an example timeline 500 for a canister purging operation using the method described herein and with regards to FIG. 4 as applied to the system described herein and with regards to FIGS. 1, 2, 3A, and 3B. Timeline 500 includes plot 510, indicating an engine status over time, plot 520, indicating whether purge conditions are met over time, and plot 530, indicating a canister purge valve (CPV) status over time. Timeline 500 further includes plot 540, indicating a bleed canister temperature over time. Line 545 indicates a temperature threshold representative of a bleed canister desorbing hydrocarbons. Timeline 500 further includes plot 550, indicating a bleed canister load over time, and plot 560, indicating the status of a bleed canister bypass valve overt time. Timeline 500 further includes plot 570, indicating a main canister load over time, and plot 580, indicating the status of a main canister bypass valve over time. The canister vent valve can be assumed to be open throughout timeline 500.

At time $t_0$, the engine is off, as indicated by plot 510. Accordingly, purge conditions are not met, as indicated by plot 520. The CPV, bleed canister bypass valve, and main canister bypass valve are all closed, as indicated by plots 530, 560, and 580, respectively. At time $t_1$, the engine is turned on, but purge conditions are not yet met. Accordingly, the CPV, bleed canister bypass valve, and main canister bypass valve are all maintained closed.

At time $t_2$, purge conditions are met. Accordingly, the CPV is opened, while the bleed canister bypass valve and main canister bypass valve are maintained closed. In this way, the purge air is directed through both the bleed canister and the main canister. Accordingly, the bleed canister temperature and load decrease as fuel vapor is desorbed, as shown by plots 540 and 550, respectively. Further, the main canister load decreases, as shown by plots 570 and 580. At time $t_3$, the bleed canister temperature reaches the threshold indicated by line 545. This signifies that the bleed canister load is greater than a threshold, and that clearing fuel vapor from the bleed canister should be prioritized over clearing fuel vapor from the main canister. Accordingly, the main canister bypass valve is opened, while the bleed canister bypass valve is maintained closed. In this conformation, the purge air is directed through the bleed canister, and then purge gasses are directed to intake while bypassing the main canister, as shown in FIG. 3A, for example. Accordingly, the bleed canister temperature and load decrease, while the main canister load remains constant.

At time $t_4$, the bleed canister temperature reaches a plateau, signifying that fuel vapor is no longer being desorbed from the bleed canister. As purge conditions are still met, the main canister may now be purged. Accordingly, the bleed canister bypass valve is opened, and the main canister bypass valve is closed. In this conformation, the purge air is directed through the bleed canister bypass conduit, through the main canister. Purge gasses are then directed to intake, as shown in FIG. 3B, for example. Accordingly, the main canister load decreases. At time $t_5$, the main canister load plateaus, and the purge event is completed. Purge conditions are no longer met, the CPV is closed, the bleed canister bypass valve is closed, and the main canister bypass valve is maintained closed.

FIG. 6 depicts a flowchart for an example high-level method 600 for a refueling event. In particular, method 600 relates to managing fuel vapor pressure within the emissions control system during fuel tank depressurization and refueling. Method 600 will be described herein with reference to the components and systems depicted in FIGS. 1, 2, and 3C though it should be understood that the method may be applied to other systems without departing from the scope of this disclosure. Method 600 may be carried out by controller 12, and may be stored as executable instructions in non-transitory memory.

Method 600 may begin at 605. At 605, method 600 may include evaluating operating conditions. Operating conditions may include, but are not limited to, fuel tank pressure, fuel fill level, ambient temperature, engine operating status, vehicle location (as determined through an on-board GPS, for example), as well as other ambient, engine, and vehicle conditions. Operating conditions may be measured by one or more sensors 216 coupled to controller 212, or may be estimated or inferred based on available data.

Continuing at 610, method 600 may include determining whether a refueling request has been received. For example, as shown in FIG. 1, vehicle instrument panel 196 may include a refueling button 197 which may be manually actuated or pressed by a vehicle operator to initiate refueling. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In other examples, a refueling event may be inferred by the vehicle operator (or a refueling attendant) opening a refueling door or otherwise attempting to gain access to fuel filler system 219.

If no refueling request is received, method 600 may proceed to 615. At 615, method 600 may include maintaining the status of the fuel system and/or the emissions control system. For example, valves such as the CPV, CVV, FTIV, main canister bypass valve, and bleed canister bypass valve may be maintained in their current position. Method 600 may then end.

If a refueling request is received, method 600 may proceed to 620. At 620, method 600 may include depressurizing the fuel tank. Depressurizing the fuel tank may include opening (or maintaining open) CVV 289, closing (or maintaining closed) CPV 261, and then opening FTIV 252. However, other fuel tank depressurizing strategies may be used depending on the fuel system configuration and the current operating conditions. For example, if the fuel tank pressure is above a threshold, a step-wise or gradual depressurization strategy may be used in order to prevent corking shut of the fill-limit vent valve and grade vent valves. Depressurizing the fuel tank may result in fuel vapor being vented to fuel vapor canister 222. However, in examples where the fuel tank contains a vacuum, depressurizing the fuel tank may result in fresh air being drawn into the fuel tank via the fuel vapor canister, which may result in some fuel vapor being desorbed from the fuel vapor canister and drawn into the fuel tank. In this example, both bleed canister bypass valve 292 and main canister bypass valve 296 are closed or maintained closed.

Continuing at 625, method 600 may include determining whether the fuel tank depressurization rate is greater than a threshold. During the fuel tank depressurization, controller 212 may monitor the fuel tank pressure via FTPT 288, and may determine a rate of pressure decrease (in the case of a positive fuel tank pressure). The depressurization rate threshold may be predetermined or may be based on current operating conditions, such as the fuel tank pressure. For example, the threshold may be based on a length of time needed for the fuel tank to depressurize from the current pressure to atmospheric pressure. If the rate of fuel tank depressurization is less than the threshold (e.g. it will take longer than a predetermined time to depressurize the tank), method 600 may proceed to 630. At 630, method 600 may include bypassing the bleed canister until the fuel tank pressure decreases below a threshold. For example, the bleed canister bypass valve may be opened and maintained open until the fuel tank pressure reaches atmospheric pressure. If the rate of fuel tank depressurization is greater than the threshold, method 600 may proceed to 635. At 635, method 600 may include maintaining airflow through the bleed canister until the fuel tank pressure decreases below the threshold. For example, the bleed canister bypass valve may be closed and maintained closed until the fuel tank pressure reaches atmospheric pressure.

In some examples, the bleed canister bypass valve may be opened and maintained opened concurrent or prior to the opening of the FTIV regardless of the current operating conditions. In this way, the bleed canister may be bypassed for the entirety of the fuel tank depressurization. As described with regard to FIG. 2, in some examples, the bleed canister bypass conduit may additionally or alternatively include a passive, pressure activated check valve configured to open and thus allow the bleed canister to be bypassed if the pressure is greater than a threshold. In examples where both a solenoid valve and a check valve are included in the canister bypass conduit, the solenoid valve may be opened and maintained opened concurrent or prior to the opening of the FTIV regardless of the current operating conditions.

When the fuel tank pressure has decreased below the threshold, method 600 may proceed to 640. At 640, method 600 may include allowing access to the fuel filler neck. Allowing access to the fuel filler neck may include unlocking refueling lock 245. Continuing at 645, method 600 may include monitoring the fuel tank pressure and fuel level during the refueling event. As described above, fuel tank pressure may be monitored via FTPT 288, and fuel fill level may be monitored by controller 212 via fuel level sensor 234.

Continuing at 650, method 600 may include determining whether the fuel tank pressure is greater than the expected fuel tank pressure for the current fuel level. An expected fuel tank pressure may be determined for the fuel tank as configured, the fuel level, fuel composition, and the rate of fuel dispensation, which may be determined based on the rate of increase of the fuel level. If the fuel tank pressure is greater than the expected pressure, it may be an indicator that there is a restriction in the emissions control system. As such, if the fuel tank pressure increases above the expected fuel tank pressure, method 600 may proceed to 655. At 655, method 600 may include bypassing the bleed canister during the refueling event. For example, the bleed canister bypass valve may be opened. As described above, a check valve may optionally be used to passively bypass the bleed canister if the fuel vapor pressure increases above a threshold. The fuel vapor pressure threshold may be less than the fuel vapor pressure that would cause an automatic shutoff of the fuel dispenser. In this way, premature automatic shutoff events may be avoided. However, if the fuel level is within a threshold of the maximum fill level, the vapor pressure threshold may be increased.

In some examples, if the bleed canister is bypassed during fuel tank depressurization, the bleed canister bypass valve may be maintained open without closing for the duration of the refueling event, regardless of fuel tank pressure during refueling. However, the bleed canister bypass valve may be closed following depressurization and re-opened during refueling. The fuel tank pressure and fuel level may continue to be monitored during the refueling event even if the bleed canister bypass valve is maintained open. If the fuel tank pressure increases above the expected pressure for a given fuel fill level while the bleed canister bypass valve is open, a restriction in the emissions control system may be indicated.

If the fuel tank pressure is not greater than the expected pressure for the current fuel level, method 600 may proceed to 660. At 660, method 600 may include maintaining airflow through the bleed canister. For example, the bleed canister bypass valve may be closed and/or maintained closed until the fuel tank pressure increases above the threshold or the refueling event ends.

When the refueling event ends, method 600 may proceed to 670. The end of the refueling event may be indicated by the removal of the fuel dispenser spout from the fuel filler neck, the replacing of the fuel cap, etc. At 670, method 600 may include sealing the fuel tank, and restoring the fuel system and emissions control system to a default status. For example, the FTIV may be closed, the main canister bypass valve may be closed, the bleed canister bypass valve may be closed, the CVV may be maintained open, and the CPV may be maintained closed. Method 600 may then end.

FIG. 7 shows an example timeline 700 for a refueling operation using the method described herein and with regards to FIG. 6 as applied to the system described herein and with regards to FIGS. 1, 2, and 3C. Timeline 700 includes plot 710, indicating whether a refueling request has been received over time, plot 720, indicating an FTIV status over time, and plot 730, indicating a refueling lock status over time. Timeline 700 further includes plot 740, indicating a fuel tank pressure over time. Line 742 represents a fuel tank depressurization rate threshold. Line 744 represents atmospheric pressure. Line 746 represents a pressure threshold indicative of a restrictive bleed canister during refueling for a fuel tank fill level more than a threshold less than the maximum fuel fill level. Line 748 represents a pressure threshold which triggers an automatic shutoff event. Timeline 700 further includes plot 750, indicating a fuel fill level over time, and plot 760, indicating the status of a bleed canister bypass valve overt time. The canister vent valve and main canister bypass valve can be assumed to be open throughout timeline 700, while the canister purge valve can be assumed to be closed.

At time $t_0$, no refuel request has been received, as indicated by plot 710. Accordingly, the FTIV, refueling lock, and bleed canister bypass valve are maintained closed, as indicated by plots 720, 730, and 760, respectively. At time $t_1$, a refueling request is received. Accordingly, at time $t_2$, the FTIV is opened, while the refueling lock and bleed canister bypass valves are maintained closed. The fuel tank pressure thus begins to decrease. At time $t_3$, the controller determines that the rate of decrease of the fuel tank pressure is less than the threshold represented by line 742. Accordingly, the bleed canister bypass valve is opened. This allows air stripped of fuel vapors by the main canister to bypass the bleed canister, as shown in FIG. 3C. This increases the flow of gasses between the emissions control system and atmosphere. As a result, the fuel tank pressure decreases at a higher rate. At time $t_4$, the fuel tank pressure reaches the threshold represented by line 744 (e.g., atmospheric pressure). Accordingly, the bleed canister bypass valve is closed, and the refueling lock is opened.

At time $t_5$, the refueling event begins. Accordingly, the fuel fill level increases, as shown by plot 750, and the fuel tank pressure also increases. At time $t_6$, the fuel tank pressure reaches the threshold represented by line 746, indicating that the fuel tank pressure is greater than the expected pressure for that fuel fill level. Accordingly, the bleed canister bypass valve is opened, and the fuel tank pressure decreases. At time $t_7$, the fuel fill level reaches the maximum level, and the fuel tank pressure increases rapidly to the automatic shut-off pressure threshold indicated by line 748. Accordingly, the bleed canister bypass valve and the FTIV are closed. The refueling event then ends.

A method for a fuel system is presented, comprising directing purge air through a first fuel vapor canister but not a second fuel vapor canister based on a load of the first fuel vapor canister being greater than a threshold. In such an example, the method may additionally or alternatively comprise directing purge air through the second fuel vapor canister but not the first fuel vapor canister based on a load of the first fuel vapor canister being below the threshold. In any of the preceding examples, directing purge air through the first fuel vapor canister but not the second fuel vapor canister may additionally or alternatively comprise directing purge air through a second fuel vapor canister bypass conduit. In any of the preceding examples, directing purge air through the second fuel vapor canister bypass conduit may additionally or alternatively include opening a second fuel vapor canister bypass valve coupled within the second fuel vapor canister bypass conduit. In any of the preceding examples, directing purge air through the second fuel vapor canister but not the first fuel vapor canister may additionally or alternatively include directing purge air through a first fuel vapor canister bypass conduit. In any of the preceding examples, directing purge air through the first fuel vapor canister bypass conduit may additionally or alternatively include opening a first fuel vapor canister bypass valve coupled within the first fuel vapor canister bypass conduit. In any of the preceding examples, the first and second fuel vapor canisters may additionally or alternatively be coupled in series within a canister vent line. In any of the preceding examples, the first fuel vapor canister may additionally or alternatively be located between the second fuel vapor canister and atmosphere. In any of the preceding examples, the method may additionally or alternatively comprise coupling the first and second fuel vapor canisters to an engine intake, and determining the load of the first fuel vapor canister based on a temperature of the first fuel vapor canister. The technical result of implementing this method is that the purging of the first canister may be prioritized and completed without passing desorbed fuel vapors through the second canister, thereby reducing the amount of time needed to purge the first canister, and reducing overall emissions.

In another example, a method for a fuel system is presented, comprising: directing fuel vapor from a fuel tank into a first fuel vapor canister but not a second fuel vapor canister based on a fuel tank pressure. In such an example, the method may additionally or alternatively comprise directing fuel vapor from the fuel tank into the first fuel vapor canister responsive to receiving a refueling request; and opening a second fuel vapor canister bypass valve responsive to a rate of fuel tank depressurization being less than a threshold. In any of the preceding examples, the method may additionally or alternatively comprise maintaining the second fuel vapor canister bypass valve closed responsive to the rate of fuel tank depressurization being greater than the threshold. In any of the preceding examples, the method may additionally or alternatively comprise directing fuel vapor from the fuel tank to the first fuel vapor canister during a refueling event, and opening the second fuel vapor canister bypass valve responsive to a fuel tank pressure being greater than a threshold. In any of the preceding examples, the method may additionally or alternatively comprise maintaining the second fuel vapor canister bypass valve closed responsive to the fuel tank pressure being less than the threshold. In any of the preceding examples, the fuel tank pressure threshold may additionally or alternatively be based on a fuel fill level. In such an example, the fuel tank pressure threshold may additionally or alternatively be less than a fuel tank pressure that triggers an automatic shutoff of a refueling dispenser. The technical result of implementing this method is that fuel tank depressurization may proceed more rapidly than it would if the fuel vapor were directed through a more restrictive pathway. Further, fuel tank pressure during refueling may be moderated, thus preventing automatic shutoffs of the refueling pump.

In yet another example, an emissions control system for a vehicle is presented, comprising: a fuel tank coupled to a main fuel vapor canister via a fuel tank isolation valve, a canister purge valve coupled between the main fuel vapor canister and an engine intake, a bleed fuel vapor canister coupled between the main fuel vapor canister and atmosphere, a bleed canister bypass valve coupled within a bleed canister bypass conduit, and a controller configured with instructions stored in non-transitory memory, that when executed, cause the controller to: open the canister purge valve; and open the bleed canister bypass valve responsive to a load of the bleed fuel vapor canister being less than a threshold. In such an example, the emissions control system may additionally or alternatively comprise a main canister bypass valve coupled within a main canister bypass conduit; and the controller may additionally or alternatively be configured with instructions stored in non-transitory memory, that when executed cause the controller to: open the canister purge valve, and open the main canister bypass valve responsive to the load of the bleed fuel vapor canister being greater than the threshold. In any of the preceding examples, the controller may additionally or alternatively be configured with instructions stored in non-transitory memory, that when executed cause the controller to: open the fuel tank isolation valve responsive to receiving a refueling request, and open the bleed canister bypass valve responsive to a rate of fuel tank depressurization being less than a threshold. In any of the preceding examples, the emissions control system may additionally or alternatively comprise a refueling lock coupled to a fuel filler neck; and the controller may additionally or alternatively be configured with instructions stored in non-transitory memory, that when executed cause the controller to: open the refueling lock responsive to a fuel tank pressure reaching atmospheric pressure, and open the bleed canister bypass valve responsive to a fuel tank pressure during a refueling event being greater than a threshold. The technical result of implementing this system is that purge air or refueling vapors may bypass the bleed canister, thus increasing purge flow through the main fuel vapor canister.

In another representation, a check valve may be coupled within the bleed canister bypass conduit. The check valve may be configured to open based on a fuel tank side pressure being greater than a threshold. In this way, if the bleed canister is restricting flow and a back pressure builds up in the fuel tank, the check valve may open, bypassing the bleed canister. This may decrease the amount of time needed to depressurize the fuel tank, and may further prevent automatic shutoff of the refueling pump.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
directing purge air through a first fuel vapor canister but not a second fuel vapor canister based on a load of the first fuel vapor canister being greater than a threshold; and
directing purge air through the second fuel vapor canister but not the first fuel vapor canister based on the load of the first fuel vapor canister being below the threshold.

2. The method of claim 1, wherein directing purge air through the first fuel vapor canister but not the second fuel vapor canister includes directing purge air through a second fuel vapor canister bypass conduit.

3. The method of claim 2, wherein directing purge air through the second fuel vapor canister bypass conduit includes opening a second fuel vapor canister bypass valve coupled within the second fuel vapor canister bypass conduit.

4. The method of claim 1, wherein directing purge air through the second fuel vapor canister but not the first fuel vapor canister includes directing purge air through a first fuel vapor canister bypass conduit.

5. The method of claim 4, wherein directing purge air through the first fuel vapor canister bypass conduit includes opening a first fuel vapor canister bypass valve coupled within the first fuel vapor canister bypass conduit.

6. The method of claim 1, wherein the first and second fuel vapor canisters are coupled in series within a canister vent line.

7. The method of claim 6, wherein the first fuel vapor canister is located between the second fuel vapor canister and atmosphere.

8. The method of claim 1, further comprising:
coupling the first and second fuel vapor canisters to an engine intake; and
determining the load of the first fuel vapor canister based on a temperature of the first fuel vapor canister.

9. A method for a fuel system, comprising:
directing fuel vapor from a fuel tank into a first fuel vapor canister but not a second fuel vapor canister based on a fuel tank pressure;
directing fuel vapor from the fuel tank into the first fuel vapor canister responsive to receiving a refueling request; and
opening a second fuel vapor canister bypass valve responsive to a rate of fuel tank depressurization being less than a threshold.

10. The method of claim 9, further comprising:
maintaining the second fuel vapor canister bypass valve closed responsive to the rate of fuel tank depressurization being greater than the threshold.

11. The method of claim 9, further comprising:
directing fuel vapor from the fuel tank to the first fuel vapor canister during a refueling event; and
opening the second fuel vapor canister bypass valve responsive to the fuel tank pressure being greater than a threshold.

12. The method of claim 11, further comprising:
maintaining the second fuel vapor canister bypass valve closed responsive to the fuel tank pressure being less than the threshold.

13. The method of claim 11, wherein the fuel tank pressure threshold is based on a fuel fill level.

14. The method of claim 13, wherein the fuel tank pressure threshold is less than a fuel tank pressure that triggers an automatic shutoff of a refueling dispenser.

15. An emissions control system for a vehicle, comprising:
a fuel tank coupled to a main fuel vapor canister via a fuel tank isolation valve;
a canister purge valve coupled between the main fuel vapor canister and an engine intake;
a bleed fuel vapor canister coupled between the main fuel vapor canister and atmosphere;
a bleed canister bypass valve coupled within a bleed canister bypass conduit; and
a controller configured with instructions stored in non-transitory memory, that when executed, cause the controller to:
open the canister purge valve; and
open the bleed canister bypass valve responsive to a load of the bleed fuel vapor canister being less than a threshold.

16. The emissions control system of claim 15, further comprising:
a main canister bypass valve coupled within a main canister bypass conduit; and
wherein the controller is further configured with instructions stored in non-transitory memory, that when executed cause the controller to:
open the canister purge valve; and
open the main canister bypass valve responsive to the load of the bleed fuel vapor canister being greater than the threshold.

17. The emissions control system of claim 15, wherein the controller is further configured with instructions stored in non-transitory memory, that when executed cause the controller to:
open the fuel tank isolation valve responsive to receiving a refueling request; and
open the bleed canister bypass valve responsive to a rate of fuel tank depressurization being less than a threshold.

18. The emissions control system of claim 17, further comprising:
a refueling lock coupled to a fuel filler neck; and
wherein the controller is further configured with instructions stored in non-transitory memory, that when executed cause the controller to:
open the refueling lock responsive to a fuel tank pressure reaching atmospheric pressure; and
open the bleed canister bypass valve responsive to a fuel tank pressure during a refueling event being greater than a threshold.

* * * * *